(12) United States Patent
Matsuoka et al.

(10) Patent No.: US 11,772,186 B2
(45) Date of Patent: Oct. 3, 2023

(54) SPOT WELDING METHOD

(71) Applicants: KABUSHIKI KAISHA TOYOTA CHUO KENKYUSHO, Nagakute (JP); TOYOTA JIDOSHA KABUSHIKI KAISHA, Toyota (JP)

(72) Inventors: Hideaki Matsuoka, Nagakute (JP); Takashi Asada, Nagakute (JP); Tatsuyuki Amago, Nagakute (JP); Kyosuke Izuno, Nisshin (JP); Koki Nakada, Toyota (JP); Tomohiko Sekiguchi, Nagakute (JP); Shuhei Ogura, Nagakute (JP)

(73) Assignees: KABUSHIKI KAISHA TOYOTA CHUO KENKYUSHO, Nagakute (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 211 days.

(21) Appl. No.: 17/373,123

(22) Filed: Jul. 12, 2021

(65) Prior Publication Data
US 2022/0111464 A1   Apr. 14, 2022

(30) Foreign Application Priority Data
Oct. 9, 2020   (JP) .................................. 2020-171405

(51) Int. Cl.
*B23K 15/00*   (2006.01)
*B23K 35/28*   (2006.01)
(Continued)

(52) U.S. Cl.
CPC .......... *B23K 15/008* (2013.01); *B23K 11/115* (2013.01); *B23K 35/0238* (2013.01);
(Continued)

(58) Field of Classification Search
None
See application file for complete search history.

(56) References Cited

U.S. PATENT DOCUMENTS

| 7,943,883 B2 | 5/2011 | Doira et al. |
| 10,173,281 B2 | 1/2019 | Sakurai et al. |

(Continued)

FOREIGN PATENT DOCUMENTS

| JP | 2006-289452 A | 10/2006 |
| JP | 2008-105087 A | 5/2008 |

(Continued)

OTHER PUBLICATIONS

Sep. 6, 2022 Office Action issued in Japanese Patent Application No. 2020-171405.

(Continued)

*Primary Examiner* — Daniel J. Schleis
(74) *Attorney, Agent, or Firm* — Oliff PLC

(57) ABSTRACT

A novel spot welding method for steel sheets and an aluminum alloy sheet, includes stacked sheet materials from a pair of opposing electrodes to join the sheet materials by resistance heating. The pair of opposing electrodes are in pressure contact with both outer surfaces of the sheet sets. The sheet sets include at least a first and second steel sheet, and an aluminum alloy sheet stacked in this order. A first energization step forms a molten pool between facing surfaces of the first and second steel sheets without melting the aluminum alloy sheet. A second energization step causes a melting reaction between facing surfaces of the second steel sheet and the aluminum alloy sheet. The first and second steel sheets are joined via a first nugget. The second steel sheet and the aluminum alloy sheet are joined via a second nugget including an intermetallic compound generated by the melting reaction.

9 Claims, 4 Drawing Sheets

(51) Int. Cl.
  *B23K 35/02* (2006.01)
  *B23K 35/30* (2006.01)
  *B23K 11/11* (2006.01)
  B23K 103/04 (2006.01)
  B23K 103/10 (2006.01)
  B23K 103/20 (2006.01)

(52) U.S. Cl.
  CPC ........ *B23K 35/286* (2013.01); *B23K 35/3053* (2013.01); *B23K 2103/04* (2018.08); *B23K 2103/10* (2018.08); *B23K 2103/20* (2018.08)

(56) References Cited

U.S. PATENT DOCUMENTS

2008/0102308 A1  5/2008  Doira et al.
2011/0123825 A1  5/2011  Sakurai et al.
2014/0144889 A1  5/2014  Sakurai et al.

FOREIGN PATENT DOCUMENTS

| JP | 2013-027890 A |   | 2/2013 |
| JP | 2013-078804 A |   | 5/2013 |
| JP | 2015-93282 A |   | 5/2015 |
| JP | 2015093282 | * | 5/2015 |
| WO | 2018/181232 A1 |   | 10/2018 |
| WO | WO2018181232 | * | 10/2018 |

OTHER PUBLICATIONS

Feb. 14, 2023 Office Action issued in Japanese Patent Application No. 2020-171405.

* cited by examiner

Tensile shear strength

| Number of times | Tensile shear strength/N |
|---|---|
| 1 | 4217 |
| 2 | 4897 |
| 3 | 4497 |
| 4 | 4351 |
| 5 | 4190 |
| Average value | 4430 |

Cross tensile strength

| Number of times | Cross tensile strength/N |
|---|---|
| 1 | 1160 |
| 2 | 1190 |
| 3 | 1090 |
| 4 | 1180 |
| 5 | 1130 |
| Average value | 1150 |

(Current density : A/mm²)

| Electrode tip diameter | Before spot welding | Second current value | | |
|---|---|---|---|---|
| | | 13kA | 16kA | 20kA |
| 8mm | | (259) | (318) | (398) |
| 10mm | | (166) | (204) | Strong welding adhesion (255) |
| 12mm | | (115) | (142) | (177) |

(First energization: 9 kA × 100 ms, Second energization: 300 ms,
Number of welding spots: 5, Spot interval: 1 second,
Electrode tip radius of curvature (R) : 40mm)

SPOT WELDING METHOD

TECHNICAL FIELD

The present invention relates to a spot welding method and relevant techniques.

BACKGROUND ART

Vehicle bodies and other similar articles are manufactured by spot welding of joining a plurality of sheet materials (materials to be joined) at multiple points. Spot welding is one type of resistance welding using Joule heating, which is performed by energizing stacked sheet materials with a large current for a short time from electrodes that are in pressure contact with the outer surfaces of the stacked sheet materials. In general, the energization forms a molten pool in the vicinity of a contact interface (portions to be joined) between the stacked sheet materials (usually steel sheets), and the molten pool is cooled and solidified into a welded portion (nugget). Thus, the plurality of steel sheets is joined together at multiple points by spot-shaped nuggets to form a structure (weldment).

In the meanwhile, not only spot welding between steel sheets, but also spot joining between a lightweight aluminum alloy sheet and a steel sheet (including these, simply referred to as "spot welding"), has come to be performed. Proposals for such spot welding are found, for example, in the following patent documents.

PRIOR ART DOCUMENTS

Patent Documents

[Patent Document 1] JP2006-289452A
[Patent Document 2] JP2008-105087A
[Patent Document 3] JP2013-78804A
[Patent Document 4] JP2013-27890A

SUMMARY OF INVENTION

Technical Problem

In Patent Documents 1 to 3, spot welding is performed on a set of sheets in which two sheet materials comprising one steel sheet and one aluminum alloy sheet are stacked. In any of these patent documents, one welding step is provided to perform large energization (15 to 30 kA) that can melt the aluminum alloy sheet having a small specific resistance value only by its resistance heating.

In Patent Document 4, a prepressing step, a preheating step, a cooling step, and a welding step are performed in this order to spot-weld a set of sheets in which three sheet materials comprising a non-plated steel sheet, a galvanized steel sheet, and an aluminum alloy sheet are stacked in this order ([0036] to [0054], Table 1, FIG. 6, etc.).

The preheating step is performed with a current value of 2 kA within a range in which each sheet material does not melt ([0041]). The preheating step is followed by the welding step, in which large energization (12.5 to 15 kA) is performed at one time ([0057], [0067], and FIGS. 7 and 8). Here, the electrodes used in Patent Document 4 are each designed with a cylindrical portion (D2): φ16 mm (nominal diameter), a spherical portion of shoulder portion (R): 5 mm (radius of curvature), and a tip portion (D1): φ6 mm ([0039]). The current density through the tip portion (tip area: $\pi \times \times 6 \times 6/4 \approx 28.3$ mm$^2$) is about 442 to 531 A/mm$^2$ (FIG. 3). The tip area is a projected area (circular area) of the tip portion.

In Patent Document 4, the energization is eventually performed with a large current density that can melt the aluminum alloy sheet only by its resistance heating. In this one welding step, the vicinity of the contact interface between the non-plated steel sheet and the galvanized steel sheet and the vicinity of the contact interface between the galvanized steel sheet and the aluminum alloy sheet are simultaneously melted and joined at once ([0044] to [0048]).

As a result of investigative research made by the present inventors, when large energization was performed such that the aluminum alloy sheet would be directly melted only by the resistance heating as in Patent Document 4, dust (explosion, scattering of spatter) occurred from between the steel sheets or between the aluminum alloy sheet and the steel sheet, and welding adhesion was likely to occur between the aluminum alloy sheet and the electrode. In addition, when the energization was performed with such a large current that the aluminum alloy sheet having high conductivity (electrical conductivity, electrical conductance) would be melted only by the resistance heating, the entire aluminum alloy sheet softened rapidly, and a large dimple (depression) was generated on the pressure-contacted electrode side. In such an aluminum alloy sheet, the remaining thickness after welding (sheet thickness other than the welded portion) became unduly small, and the aluminum alloy sheet was likely to break from the welding spot (in particular, the aluminum alloy sheet portion); therefore, it was difficult to ensure the joint strength of the weldment.

The present invention has been made in view of such circumstances, and an object of the present invention is to provide a novel method and relevant techniques with which spot welding between a steel sheet and an aluminum alloy sheet can be stably and appropriately performed.

Solution to Problem

As a result of intensive studies to achieve the above object, the present inventors have conceived of performing at least two stages of energization steps when spot-joining two steel sheets and an aluminum alloy sheet. In the first energization step, only the steel sheets are partially melted therebetween without melting the aluminum alloy sheet. In the second energization step, the heat transfer from the steel sheets side is used to melt the aluminum alloy sheet through energization within a range in which the aluminum alloy sheet is not melted only by the resistance heating. Thus, the present inventors have newly found that the spot welding, which is the dissimilar metal joining, can be performed stably. Developing this achievement, the present inventors have accomplished the present invention, which will be described hereinafter.

《Spot Welding Method》

(1) The present invention provides a spot welding method of energizing a set of sheets comprising a plurality of stacked sheet materials from a pair of opposing electrodes to join the sheet materials by resistance heating. The pair of opposing electrodes are in pressure contact with both outer surfaces of the set of sheets. The set of sheets comprises at least a first steel sheet, a second steel sheet, and an aluminum alloy sheet that are stacked in this order. The spot welding method comprises a first energization step of forming a molten pool between facing surfaces of the first steel sheet and the second steel sheet without melting the aluminum alloy sheet and a second energization step of, after the first energization step, causing a melting reaction between facing surfaces of the second steel sheet and the aluminum alloy sheet. The first steel sheet and the second steel sheet are joined via a first nugget. The second steel sheet and the aluminum alloy sheet are joined via a second nugget including an intermetallic compound generated by the melting reaction.

According to the present invention, the spot welding method (simply referred to as a "welding method" or a "joining method") for the steel sheets and the aluminum alloy sheet can be stably performed while suppressing the occurrence of spatter (dust) from between the sheet materials, welding adhesion between the sheet materials and the electrodes, reduction of the sheet thickness and depression of the sheet materials, and the like.

The reason why such an excellent effect can be obtained is considered as follows. In the first energization step, melting is mainly caused between the first steel sheet and the second steel sheet through the energization with a current within a range in which the aluminum alloy sheet is substantially not melted. This first energization step is performed with a suppressed current value, and therefore spatter is less likely to occur not only between the second steel sheet and the aluminum alloy sheet but also between the first steel sheet and the second steel sheet.

In the second energization step, not only the aluminum alloy sheet is resistance-heated, but also the molten pool or its solidified portion having been formed between the first steel sheet and the second steel sheet is also resistance-heated. The aluminum alloy sheet is therefore heated and melted by its own resistance heating and the heat transfer from the second steel sheet side (see FIG. 7). Thus, even the aluminum alloy sheet having a high conductivity can be melted by energization with a suppressed current value, and the occurrence of spatter from between the sheet materials or the like is suppressed also in the second energization step.

Furthermore, in the second energization step, energization is possible with a suppressed current value lower than that in the prior art; therefore, overheating of the aluminum alloy sheet itself is suppressed, and excessive softening, deformation (such as dimples due to the electrodes), remaining thickness reduction, and the like of the aluminum alloy sheet are avoided accordingly. Thus, even when dissimilar metal sheets are spot-welded, a weldment ensuring desired strength can be obtained. During the second energization step, the molten pool or its solidified portion having been formed between the first steel sheet and the second steel sheet is also heated to grow/increase. This can further improve the joint strength of the weldment. The molten pool or solidified portion generated in the first energization step becomes the "first nugget" after the second energization step.

«Spot Weldment and Control Device or Control Program for Spot Welding»

The present invention is also perceived as a spot weldment obtained by the above-described method. Additionally or alternatively, the present invention is also perceived as a control device or its control program for spot welding that controls at least the energization through the above-described electrodes.

In the features of the control device and the control program, for example, the features of "-steps" according to the above-described method are read and perceived as "-means" or "-units." Additionally or alternatively, the present invention may be perceived as a control method of executing the control program on a computer by reading "-steps" as "-program steps."

«Others»

(1) The first current value for energization in the first energization step and the second current value for energization in the second energization step are adjusted within predetermined ranges in accordance with the objects to be welded (such as the composition, sheet thickness, and surface state of each sheet material), other welding conditions (such as the spec of electrodes, pressing force, and energization time), required strength of the weldment, etc. Note, however, that the second current value (average value) is usually larger than the first current value (average value). Additionally or alternatively, the second current value may be preferably a current value smaller than a melting current value that allows the aluminum alloy sheet to be melted only by the resistance heating.

(2) For descriptive purposes, the term "first" is attached to one related to the first energization step or one on the first steel sheet side, and the term "second" is attached to one related to the second energization step or one on the aluminum alloy sheet side.

(3) Unless otherwise stated, a numerical range "x to y" as referred to in the present specification includes the lower limit x and the upper limit y. Any numerical value included in various numerical values or numerical ranges described in the present specification may be selected or extracted as a new lower or upper limit, and any numerical range such as "a to b" can thereby be newly provided using such a new lower or upper limit. Unless otherwise stated, a range "x to y kA" as referred to in the present specification means x kA to y kA. The same applies to other unit systems (such as $A/mm^2$).

EMBODIMENTS FOR CARRYING OUT THE INVENTION

Figure 1:
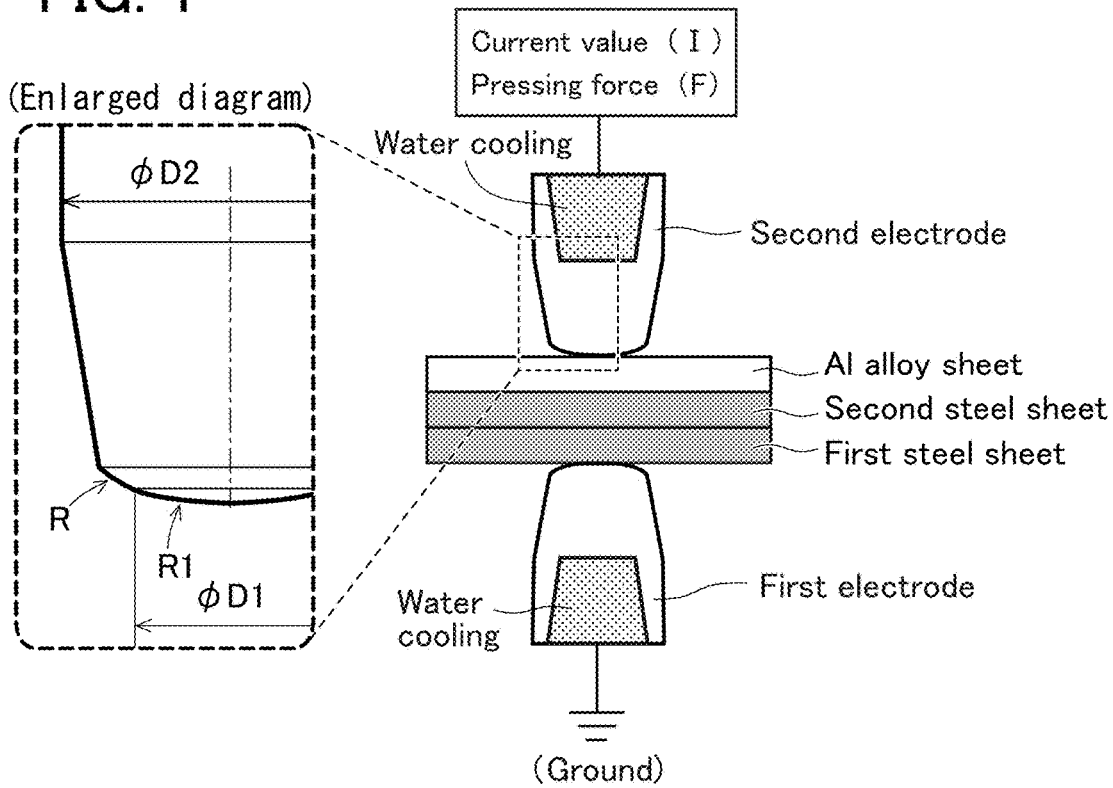
FIG. 1 is a schematic diagram illustrating the overview of spot welding.

One or more features freely selected from the present specification can be added to the above-described features of the present invention. The content described in the present specification can be applied not only to the welding method or a resultant (such as a weldment) but also to a control device, a control program, etc. Which embodiment is the best or not is different in accordance with objectives, required performance, and other factors.

«Sheet Materials/Set of Sheets»

Spot welding is performed on a set of sheets in which at least two steel sheets (a first steel sheet and a second steel sheet) and an aluminum alloy sheet (simply referred to as an "Al alloy sheet") are stacked. The number of steel sheets located at least on one surface side of the Al alloy sheet may also be three or more. Additionally or alternatively, at least one or more steel sheets may be provided on the other surface side of the Al alloy sheet. There may be a plurality of Al alloy sheets. Each sheet material may have a site to be joined without relying on spot welding. According to the welding method of the present invention, it is also possible to join one steel sheet and one Al alloy sheet. In this case, one steel sheet that is substitute for the two steel sheets may preferably have a thickness of 1.5 times or more that of the Al alloy sheet.

The steel sheets may be sheet materials having the same component composition, surface treatment state (such as presence or absence of plating), sheet thickness, etc. or may otherwise be different sheet materials. Each steel sheet is, for example, a cold-rolled steel sheet, a hot-rolled steel sheet, a high-strength steel sheet, a hot-stamped steel sheet, or other similar steel sheet.

The steel sheets may be surface-treated. For example, the second steel sheet to be joined to the Al alloy sheet may preferably have a metal layer having a melting point lower than that of the Al alloy sheet (simply referred to as a "low melting point metal layer") at least on the Al alloy sheet side. The low melting point metal layer melts prior to (in priority to) the base material (Al alloy) of the Al alloy sheet during the second energization step and spreads wet between the surfaces to be joined of the Al alloy sheet and the second steel sheet. This expands the joint area caused by the second nugget, and the joint strength between the sheet materials is improved.

Galvanization is the typical surface treatment for a steel sheet. The galvanized steel sheet is, for example, a hot-dip galvanized steel sheet, an electro galvanized steel sheet, an alloyed hot-dip galvanized steel sheet, or the like. The alloyed hot-dip galvanized steel sheet may be an aluminum-zinc alloy-plated steel sheet (so-called Galvalume steel sheet (registered trademark)). Metal layers (such as galvanized layers) are usually on both surfaces of a steel sheet, but a single metal layer may be provided only on one surface of a steel sheet. The first steel sheet may be surface-treated (such as a plated steel sheet) or not surface-treated (such as a non-plated steel sheet).

For the Al alloy sheet, 2000 series to 8000 series, in particular 5000 series or 6000 series, are usually used. For example, in the case of the 5000 series, Al alloy sheets corresponding to A5052, A5083, A5005, etc. defined by JIS are often used. In the case of the 6000 series, Al alloy sheets corresponding to A6022, A6016, A6N01, etc. defined by JIS are often used. The Al alloy sheet as referred to in the present specification may include A1000 series.

The sheet thickness of each sheet material may be the same or different. The sheet thickness of the steel sheets is, for example, 0.4 to 2.5 mm in an embodiment or 0.6 to 1.8 mm in another embodiment. The sheet thickness of the Al alloy sheet is, for example, 0.8 to 3 mm in an embodiment or 1 to 2 mm in another embodiment.

«First Energization Step»

(1) The first energization step is provided to form a molten pool or its solidified portion between the facing surfaces of the first steel sheet and the second steel sheet. When the energization is performed with a DC current, the (first) current value is, for example, 4 to 10 kA in an embodiment, 6 to 9.5 kA in another embodiment, or 7 to 9.0 kA in still another embodiment. The (first) current density is, for example, 10 to 200 A/mm$^2$ in an embodiment or 25 to 100 A/mm$^2$ in another embodiment. If the current value or the current density is unduly small, it will be difficult to form a sufficient molten pool or its solidified portion and accordingly the first nugget between the steel sheets. If the current value or the current density is unduly large, dust, welding adhesion, or the like is likely to occur.

When the current value varies, the average value obtained through dividing the integral value of the current value (absolute value) with respect to the energization time by the energization time is adopted as the "(first) current value." The current density is obtained through dividing the current value by the tip area of an electrode. When the tip portion of an electrode having an approximately cylindrical shape or an approximately cylindrical solid shape is in a flat shape or a radius shape, for example, the tip area of the electrode is obtained as a circular area (area corresponding to the tip diameter: D1) projected from the tip portion. The tip area of an electrode can be substituted with the area of an indentation formed on the sheet material after spot welding (contact area between the sheet material and the electrode). The first current density is calculated, for example, through dividing the first current value by the tip area (first tip area) of the electrode (first electrode) on the first steel sheet side. The same applies to the second energization step (second current value, second current density, and second tip area of second electrode), which will be described later.

(2) The pressing force in the first energization step is, for example, 2 to 6 kN in an embodiment or 3 to 5 kN in another embodiment. The energization time is, for example, 25 to 200 ms in an embodiment or 50 to 150 ms in another embodiment. If the pressing force or the energization time is unduly small, the formation of the molten pool (solidified portion) or first nugget between the steel sheets will be unstable, and dust is likely to occur in the second energization step. If the pressing force is unduly large, deep dents (dimples, depressions) may occur on the sheet materials (in particular, the Al alloy sheet). If the energization time is unduly long, the second nugget formed in the second energization step will be unduly large, and dust is likely to occur.

The molten pool or its solidified portion formed in the first energization step may have such a size that it serves as a heating source due to heat transfer for the Al alloy sheet in the second energization step. Even when the molten pool or its solidified portion is small at the end of the first energization step, it can grow in the second energization step to become a sufficient first nugget. In this regard, the (first) energization time of the first energization step may be shorter than the (second) energization time of the second energization step.

(3) Before the first energization step, a pre-energization step may be performed in which the temperature of the set of sheets is raised so that the contact state between the sheet materials is settled. The pre-energization step may be preferably performed by energizing the set of sheets, with which the electrodes are in pressure contact, without forming a molten pool. For example, the pre-energization step is performed by energization with a pre-current value (time average value) smaller than the first current value. The pre-current value is, for example, 0.5 to 3 kA in an embodiment or 1 to 2 kA in another embodiment.

«Second Energization Step»

(1) The second energization step causes a melting reaction between the facing surfaces of the second steel sheet and the Al alloy sheet to form the second nugget. When the energization is performed with a DC current, the (second) current value is, for example, 11 to 15 kA in an embodiment, 11.5 to 14.5 kA in another embodiment, or 12 to 14 kA in still another embodiment. The second current value is usually set larger than the first current value (e.g., larger by about 2 to 6 kA in an embodiment or larger by about 3 to 5 kA in another embodiment). The (second) current density is, for example, 50 to 300 A/mm$^2$ in an embodiment or 100 to 250 A/mm$^2$ in another embodiment. If the current value or the current density is unduly small, the melting of the Al alloy sheet and the formation of the second nugget will be insufficient between the second steel sheet and the Al alloy sheet. If the current value or the current density is unduly large, spatter from between the sheet materials, welding adhesion between the sheet materials and the electrodes, etc. are likely to occur. As previously described, the second current density is calculated, for example, through dividing the second current value by the tip area (second tip area) of the electrode (second electrode) on the Al alloy sheet side.

(2) The pressing force in the second energization step is, for example, 2 to 6 kN in an embodiment or 3 to 5 kN in another embodiment. The energization time is, for example, 50 to 500 ms in an embodiment or 150 to 400 ms in another embodiment. If the pressing force is unduly small, dust is likely to occur from between the Al alloy sheet and the second steel sheet. If the pressing force is unduly large, a deep dent (depression) is likely to occur on the Al alloy sheet. If the energization time is unduly short, the melting of the Al alloy sheet and the formation of the second nugget between the Al alloy sheet and the second steel sheet will be insufficient. If the energization time is unduly long, welding adhesion, wear, and the like of the electrodes (in particular, on the Al alloy sheet side) are likely to occur, and the productivity may be lowered.

(3) A cooling step of lowering the temperature of the set of sheets may be performed after the first energization step and before the second energization step. The cooling step is usually performed through the electrodes which are pressure contact with the set of sheets. The cooling step may be performed by non-energization of cutting off the energization through the electrodes or may otherwise be performed by energization with a current value smaller than that in the first energization step.

The electrical resistance value of the set of sheets is reduced by the cooling step and falls within a desired range. Therefore, when the energization is performed with a large second current value in the second energization step, spatter or the like occurring at least from between the second steel sheet and the Al alloy sheet can be suppressed.

«Heat Treatment Step»

The set of sheets joined after the second energization step may be further subjected to heat treatment such as annealing or tempering. Through the heat treatment, adjustment of the structure, removal of the residual stress, and the like are achieved in each joined portion (nugget) or its vicinity (heat-affected portion).

The heating temperature in the heat treatment step is, for example, 120° C. to 250° C. in an embodiment or 150° C. to 200° C. in another embodiment. The heating time is, for example, 10 to 180 minutes in an embodiment or 30 to 120 minutes in another embodiment. The heating method may be, for example, heating in a furnace or energization heating. The heating range may be the entire joined set of sheets or a spot-welded local area.

«Electrodes»

(1) Form

The electrodes for spot welding may each be an electrode that can be detachably attached to a shank (a cap tip-type electrode) or may otherwise be an electrode that is integrated with a shank (an integrated-type electrode). The cap tip-type electrode (also referred to as a "tip") is usually used in order to reduce the cost.

The electrode (tip) has, for example, a tip portion that is formed in a bottomed and approximately cylindrical shape and a body portion that is formed in an approximately cylindrical shape and merges into the tip portion. The outer surface (pressure contact surface) of the tip portion may be a convex surface or a recessed concave surface. The size of the electrode is not limited. The outer diameter (nominal diameter/D2) of the body portion is, for example, φ10 to 20 mm in an embodiment or φ12 to 18 mm in another embodiment. The tip diameter (D1) is, for example, φ6 to 14 mm in an embodiment or φ8 to 12 mm in another embodiment.

The electrode is preferably configured such that a cooling medium (cooling liquid/cooling water) is introduced into an inner cylindrical part provided inside the tip portion. When the cooling medium is forcibly circulated, suppression of temperature rise of the electrode and cooling of the sheet materials through the electrode are stably achieved.

Various basic shapes of the tip portions of electrodes (in particular, convex electrodes) are defined in JIS C9304 (1999). Examples of the basic shapes include a flat shape (F-type), a radius shape (R-type), a dome shape (D-type), a dome radius shape (DR-type), a cone frustum shape (CF-type), and a cone frustum radius shape (CR-type). For spot welding of the steel sheets and the Al alloy sheet, for example, DR-type or R-type electrodes may be used from the viewpoint of versatility.

(2) Material

The electrodes (at least the tip portions) are preferably made of a material excellent in the thermal conductivity, electrical conductivity, strength, etc. For example, the electrodes to be used are made of a copper alloy having an electrical conductivity of 75% to 95% IACS in an embodiment or 80% to 90% IACS in another embodiment. The copper alloy is, for example, chromium copper, zirconium copper, chromium-zirconium copper, alumina-dispersed copper, beryllium copper, or the like.

The electrode in contact with the steel sheet and the electrode in contact with the Al alloy sheet may have the same form (shape, size (diameter)) and material or different forms and materials.

«Others»

The current value (current density) and/or the pressing force may be varied during or between the energization steps. For example, at the start of each energization step, an ascending process (upslope process) of moderately increasing the amount of energization may be provided to suppress the occurrence of dust due to a sudden increase in the current value. Additionally or alternatively, at the end of each energization step, a descending process (downslope process) may be provided to moderately reduce the amount of energization to suppress weld cracking (such as solidification cracking caused by solidification shrinkage of the molten pool or hot cracking that can occur around the recrystallization temperature) due to a sudden drop in the current value.

The pressing force may also be varied for each step, during each step, or between steps. However, it is preferred to set the pressing force to such an extent that the Al alloy sheet does not excessively decrease in the sheet thickness due to indentation formed by the electrodes. In general, it suffices that the pressing force is approximately constant during or between steps.

EXAMPLES

The present invention will be specifically described while exemplifying a case in which a set of sheets comprising two steel sheets and an Al alloy sheet that are stacked in order is joined by spot welding.

«Overview»

FIG. 1 illustrates the overview of spot welding according to the present example. The materials to be welded are a set of sheets in which a first steel sheet, a second steel sheet, and an Al alloy sheet are stacked in this order. Spot welding is performed by energizing the set of sheets while clamping both outer surfaces with a pair of electrodes.

(1) Sheet Materials

A non-plated cold-rolled steel sheet (440 MPa class/sheet thickness: 1.4 mm) was used as the first steel sheet while an alloyed hot-dip galvanized steel sheet (270 MPa class/sheet thickness: 0.8 mm) was used as the second steel sheet, with an Al alloy sheet (wrought material equivalent to JIS A6022/sheet thickness: 1.2 mm). The galvanized steel sheet is formed with galvanized layers (metal layers) having a thickness of about 8 μm. The melting point of the galvanized layer itself is about 420° C., and the melting point of the Al alloy sheet is about 650° C.

Each sheet material was subjected to the spot welding without any modification such as surface polishing. Each sheet material was cut into a strip shape (30 mm×100 mm) and used.

(2) Electrodes

The same DR-type (JIS C9304) commercially available tips (available from OBARA Corporation) were used for the first electrode on the first steel sheet side and the second electrode on the Al alloy sheet side. Forcibly circulated cooling water (flow rate: 4 L/min) was supplied into the inside (inner cylindrical parts) of the tips to forcibly cool the tips. The electrodes are made of chromium copper (Cr: 1 mass %, Cu: the balance) and the electrical conductivity is 80% IACS.

As illustrated in the enlarged diagram of FIG. 1, the sizes of the electrodes were set to a tip diameter (nominal diameter D2): φ16 mm, a tip bottom portion thickness of 12 mm, a tip shoulder portion radius of curvature (R): 8 mm, a tip surface radius of curvature (R1): 40 mm, and a tip diameter (D1) of either 8 mm, 10 mm, or 12 mm. Unless otherwise stated, electrodes having a tip diameter (D1): 12 mm were used.

(3) Welding Conditions

Figure 2:
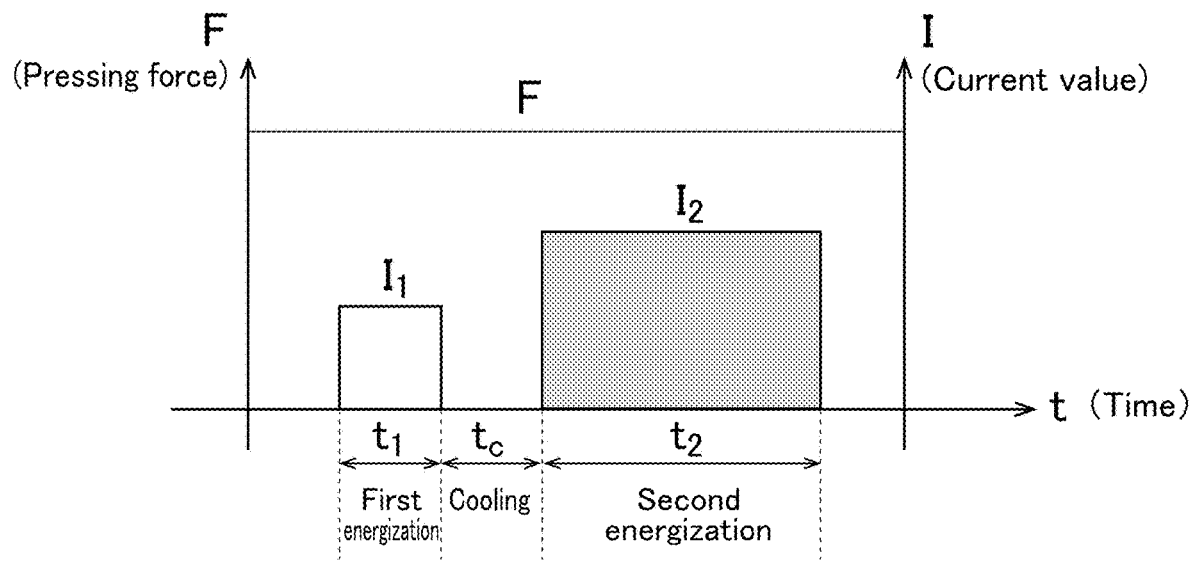
FIG. 2 is a time chart example related to the spot welding.

Spot welding was performed along the energization pattern illustrated in FIG. 2 using a servo pressure-type spot welder (PA235KVAMF available from ARO). Specifically, the energization was performed by controlling the DC current, and the current value during each energization step was set constant except for the transitional periods at the start and end of the energization. The pressing force (F) was set to 4 kN (constant). The first energization step was designed with a first current value ($I_1$): 9 kA and an energization time: 100 ms. The second energization step was designed with a second current value ($I_2$): 10 to 20 kA and an energization time: 300 ms. When the pre-energization is performed before the first energization step for settlement between the sheet materials or between the electrodes and the sheet materials, the quality (joint strength) of the weldment can be stabilized even during mass production.

In addition, the cooling step was provided before the start of the second energization step. In the cooling step, a period of 200 ms after the completion of the first energization step was set to a non-energization state. This allows the set of sheets to be cooled through both the electrodes, and the electric resistance value between the sheet materials (in particular, between the second steel sheet and the Al alloy sheet) is reduced into a predetermined range. According to this cooling step, the subsequent second energization step can be stably performed.

«Observation»

Figure 3A:
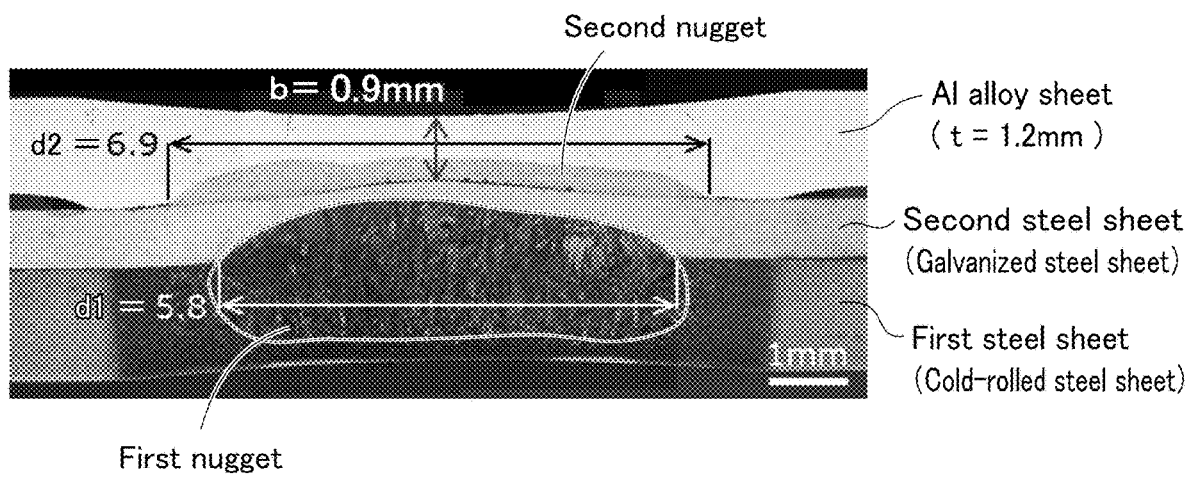
FIG. 3A is a microscope photograph showing a cross section of a set of spot-welded sheets (weldment).

(1) FIG. 3A shows a photograph obtained using an inverted metallographic microscope (GX53 available from Olympus Corporation) to observe the cross section of a joined portion in which the above-described set of sheets is spot-welded (second current value: 13 kA, electrode tip diameter: φ12 mm, current density: 115 A/mm$^2$). As apparent from FIG. 3A, it has been confirmed that the first steel sheet and the second steel sheet are joined via the first nugget located between their facing surfaces, and the second steel sheet and the Al alloy sheet are joined via the second nugget located between their facing surfaces. From FIG. 3A, it has been found that both the first steel sheet and the second steel sheet are melted and then solidified to form the first nugget. From FIG. 3A, it has also been found that the Al alloy sheet is mainly melted and solidified to form the second nugget.

As found from FIG. 3A, both the first nugget and the second nugget have sufficient sizes (diameters) and thicknesses (lengths in the sheet thickness direction). It has also been found that the indentation (dimple, depression) on the Al alloy sheet side due to the electrode remains at a depth of about 0.3 mm (sheet thickness reduction: about 25%).

Figure 3B:
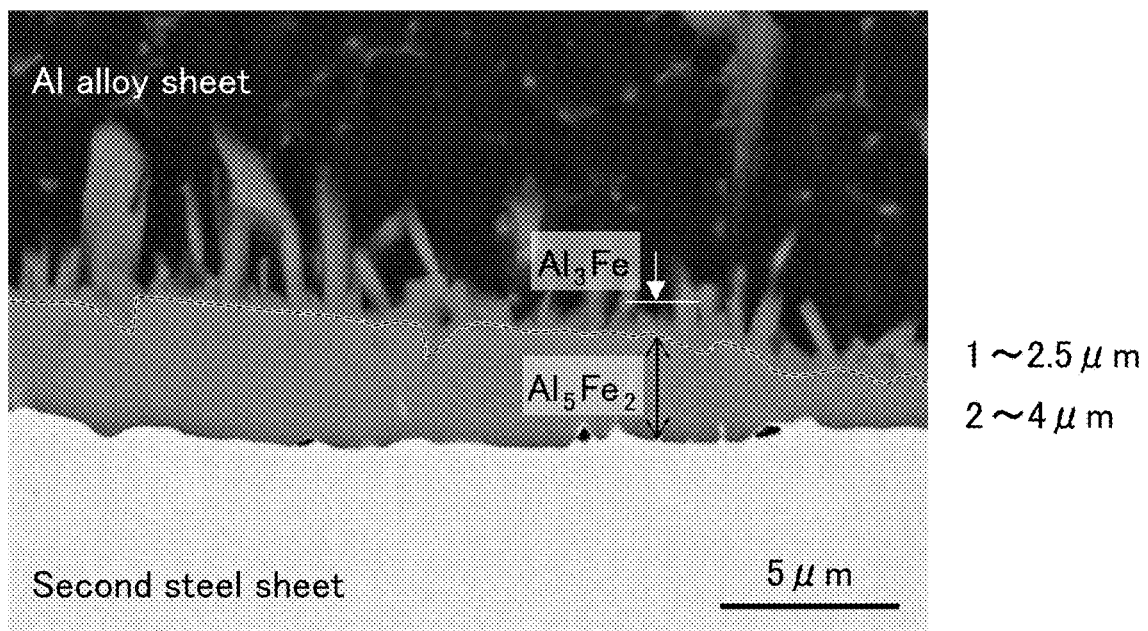
FIG. 3B is a microscope photograph showing a cross section of an aluminum alloy sheet and a second steel sheet in the vicinity of a joint interface.

(2) FIG. 3B shows a photograph obtained using a scanning electron microscope (S-3600N available from Hitachi High-Tech Corporation) to observe the structure near the joint interface between the second steel sheet and the Al alloy sheet. When the structure was observed with an energy dispersive X-ray spectroscope (EDX) attached to the microscope, plural types of intermetallic compounds, for example, $Fe_2Al_5$ phase, $FeAl_3$ phase, and Fe—Al—Zn phase (solid solution of Zn mainly in $Fe_2Al_5$) or Al—Zn phase were observed. Suffice it to say that a large amount of $Al_5Fe_2$ phase (or Fe—Al—Zn phase) was confirmed on the second steel sheet side, and $Al_3Fe$ phase was confirmed on the Al alloy sheet side.

In general, the intermetallic compound layer (interfacial reaction layer) is brittle, so it is said that its thickness is preferably 1 to 2 μm or less. However, fortunately, even though the thickness of the intermetallic compound layer in the present example was about 4.3 μm, sufficient joint strength was ensured as described below.

«Joint Strength»

Figure 4A:
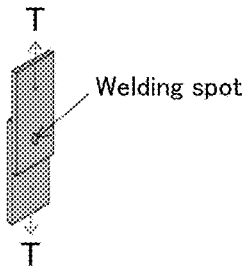
FIGS. 4A and 4B are a set of schematic diagrams of joint strength evaluation tests and data tables listing evaluation examples.
Figure 4B:
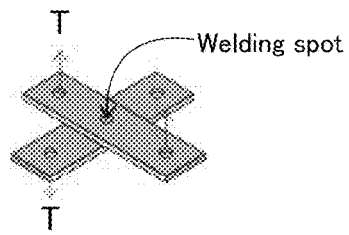

(1) As illustrated and listed in FIGS. 4A and 4B, two types of test pieces were prepared by spot welding (second current value: 13 kA, electrode tip diameter: φ12 mm, current density: 115 A/mm$^2$), and their joint strength was evaluated.

(2) As listed in FIG. 4A, the tensile shear strength (average value of 5 times) was 4430 N. As listed in FIG. 4B, the cross tensile strength (average value of 5 times) was 1150 N. In each case, it has been confirmed that sufficient joint strength is ensured. The joint strength listed in FIGS. 4A and 4B is the load at the time of fracture.

«Second Current Value»

Figure 5:
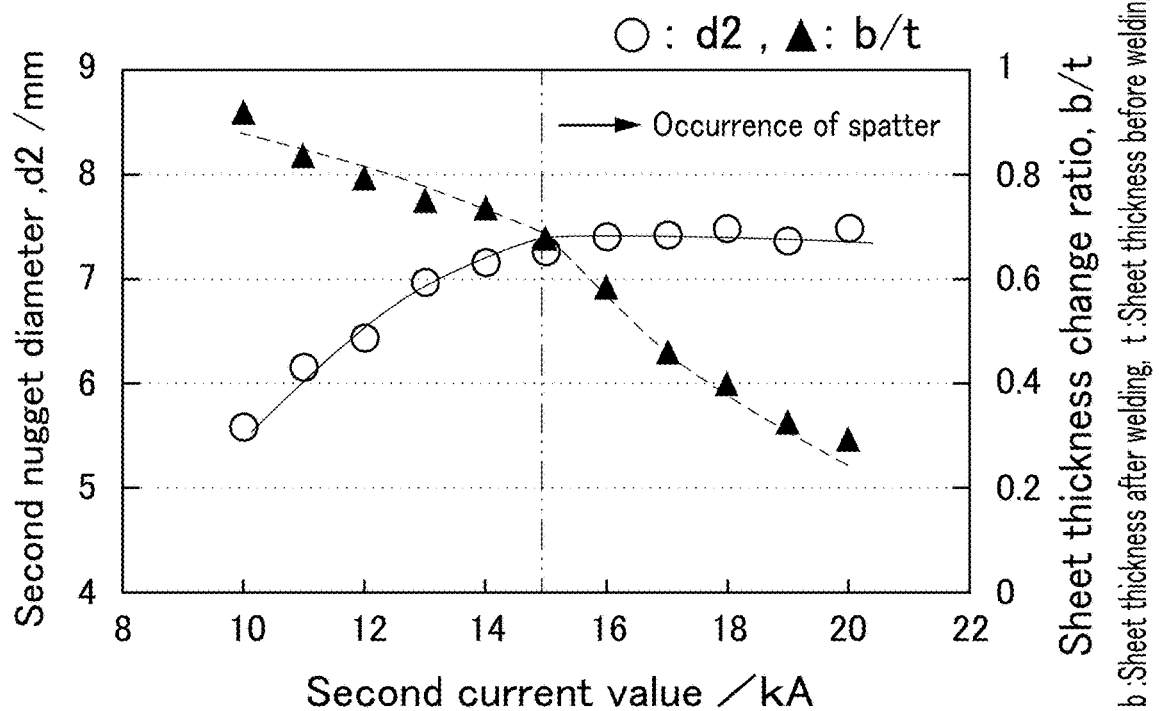
FIG. 5 is a graph illustrating an example of the relationship between a second current value in a second energization step and a second nugget diameter or a sheet thickness reduction ratio of the aluminum alloy sheet.

(1) As illustrated in FIG. 5, spot welding (electrode tip diameter: φ12 mm) was performed with a variety of the second current values. The cross section of each welded portion thus obtained was observed with the above-described microscope (see FIG. 3A), and the size of the second nugget (simply referred to as a "second nugget diameter ($d_2$)") and the sheet thickness reduction ratio (b/t) of the Al alloy sheet were measured. Here, $d_2$ is the minimum width of the second nugget, and b is the thickness obtained by subtracting the thickness of the second nugget from the minimum thickness of the Al alloy sheet. The sheet thickness t is 1.2 mm (constant).

(2) As found from FIG. 5, when the second current value was 16 kA or more (more than 15 kA), spatter occurred from between the Al alloy sheet and the second steel sheet. After that, even when the second current value increased, the second nugget diameter ($d_2$) scarcely increased, and the remaining sheet thickness (thickness other than the second nugget) of the Al alloy sheet decreased sharply.

«Welding Adhesion»

Figures 6, 7:
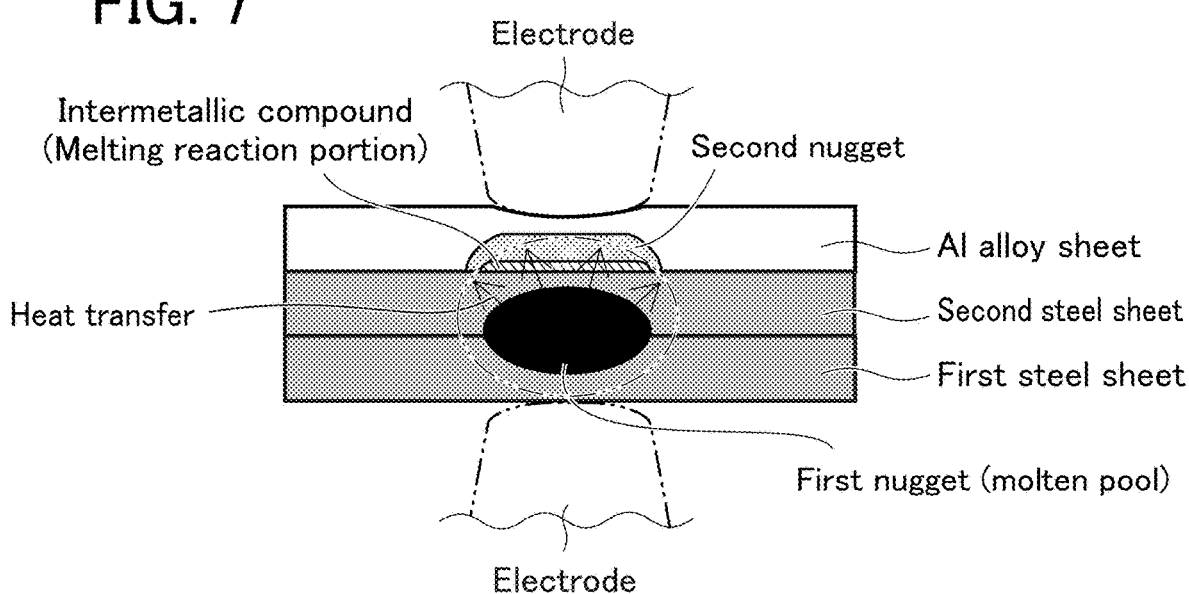
FIG. 6 is a set of photographs summarizing the influence of the second current value or the tip diameter of an electrode on the welding adhesion between the aluminum alloy sheet and the electrode.
FIG. 7 is a schematic diagram illustrating the progress process of spot welding.

(1) As shown in FIG. 6, spot welding was performed with varieties of the second current values and the electrode tip diameters. Spot welding was performed at 5 points at 1-second intervals. The spot interval was 35 mm. The tip surfaces of the electrodes on the Al alloy sheet side after the spot welding were observed. The photographs of the electrodes are listed in FIG. 6. FIG. 6 also lists the current density obtained through dividing the second current value by the electrode tip area ($\pi D1^2/4$).

(2) As found from FIG. 6, when the second current value was 16 kA or more (more than 15 kA), welding adhesion with the Al alloy was observed on the tip surface of the copper alloy electrode even in the spot welding of at most 5 points. However, it has also been found that the welding adhesion level can be reduced by increasing the electrode tip diameter to lower the current density.

On the other hand, it has also been found that when the second current value is 13 kA (15 kA or less), welding adhesion can be suppressed regardless of the electrode tip diameter (current density).

As described above, it has been found that by performing the first energization step and the second energization step, the set of sheets comprising the first steel sheet, the second steel sheet, and the Al alloy sheet can be well spot-welded. It has also been found that the second current value is preferably set to 15 kA or less in order to suppress the occurrence of spatter and the welding adhesion of electrodes.

The invention claimed is:

1. A spot welding method of energizing a set of sheets comprising a plurality of stacked sheet materials from a pair of opposing electrodes to join the sheet materials by resistance heating, the pair of opposing electrodes being in pressure contact with both outer surfaces of the set of sheets, the set of sheets comprising at least a first steel sheet, a second steel sheet, and an aluminum alloy sheet that are stacked in this order, the spot welding method comprising:

a first energization step of forming a molten pool between facing surfaces of the first steel sheet and the second steel sheet without melting the aluminum alloy sheet; and a second energization step of, after the first energization step, causing a melting reaction between facing surfaces of the second steel sheet and the aluminum alloy sheet, the first steel sheet and the second steel sheet being joined via a first nugget, the second steel sheet and the aluminum alloy sheet being joined via a second nugget including an intermetallic compound generated by the melting reaction, wherein an energization time of the first energization step is shorter than an energization time of the second energization step.

2. The spot welding method according to claim 1, wherein the second energization step is performed by energization with a current value smaller than a melting current value that allows the aluminum alloy sheet to be melted only by the resistance heating.

3. The spot welding method according to claim 1, wherein the first energization step and the second energization step are performed by energization with a DC current, the first energization step includes energization with a first current value of 4 to 10 kA, and the second energization step includes energization with a second current value of 10 to 15 kA.

4. The spot welding method according to claim 1, wherein the second energization step is performed with a second current density of 50 to 300 A/mm$^2$, wherein the second current density is obtained through dividing a current value by a tip area of the electrode in contact with the aluminum alloy sheet.

5. The spot welding method according to claim 1, further comprising a cooling step of, after the first energization step and before the second energization step, lowering a temperature of the set of sheets in contact with the electrodes through no energization or energization with a current value smaller than that during the first energization step.

6. The spot welding method according to claim 1, further comprising a heat treatment step of annealing or tempering the set of sheets joined after the second energization step.

7. The spot welding method according to claim 1, wherein the second steel sheet has a metal layer at least on the aluminum alloy sheet side, wherein the metal layer has a melting point lower than that of the aluminum alloy sheet.

8. The spot welding method according to claim 7, wherein the metal layer is composed of a galvanized layer.

9. The spot welding method according to claim 1, wherein (i) the first energization step is performed by energization with a DC current of 4 to 10 kA for 25 to 150 ms; and (ii) the second energization step is performed by energization with a DC current of 10 to 15 kA for 150 to 500 ms.

* * * * *